I. M. JACOBS & W. CRAMER.
ADJUSTABLE BRAKE RIGGING FOR MOTOR VEHICLES.
APPLICATION FILED OCT. 26, 1917.

1,273,615.

Patented July 23, 1918.

Inventors:
Isidor M. Jacobs,
William Cramer,
By Hugh K. Wagner
Attorney.

UNITED STATES PATENT OFFICE.

ISIDOR M. JACOBS, OF KANSAS CITY, AND WILLIAM CRAMER, OF ST. LOUIS, MISSOURI, ASSIGNORS, BY MESNE ASSIGNMENTS, TO TRUCK, TRACTOR AND MANUFACTURING COMPANY, OF ST. LOUIS, MISSOURI, A CORPORATION OF MISSOURI.

ADJUSTABLE BRAKE-RIGGING FOR MOTOR-VEHICLES.

1,273,615.     Specification of Letters Patent.     Patented July 23, 1918.

Application filed October 26, 1917. Serial No. 198,648.

*To all whom it may concern:*

Be it known that we, ISIDOR M. JACOBS and WILLIAM CRAMER, citizens of the United States, residing at Kansas City, in the county of Jackson and State of Missouri, and St. Louis, State of Missouri, respectively, have invented certain new and useful Improvements in Adjustable Brake-Rigging for Motor-Vehicles, of which the following is a specification.

This invention, while it may be of general utility, is especially designed in aid of the salvaged constructions contemplated by the application for patent, Serial Number 163,652, filed by one of the joint inventors herein named, and consists of a brake adjuster such as it is desirable to use in conjunction with the invention described in the above-mentioned application. The motor power plants used in carrying out that invention vary in size, shape, and other details, and make it necessary in carrying out the invention described in the said application for patent to have at hand a simple and inexpensive means for operating such brake as may be found on, for instance, a salvaged vehicle.

In the accompanying drawings, forming part of this specification, in which like numbers of reference denote like parts wherever they occur, Figure 1 is a side elevation;

Figure 1:
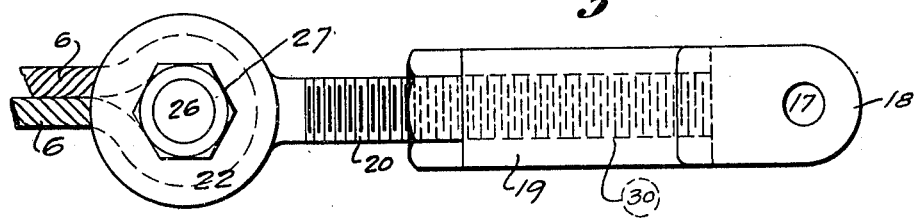

The wheels 1, the engine 2, the chassis 3, the seat 4 and the brake handle 5 may be of any ordinary or desired construction.

Figure 2:
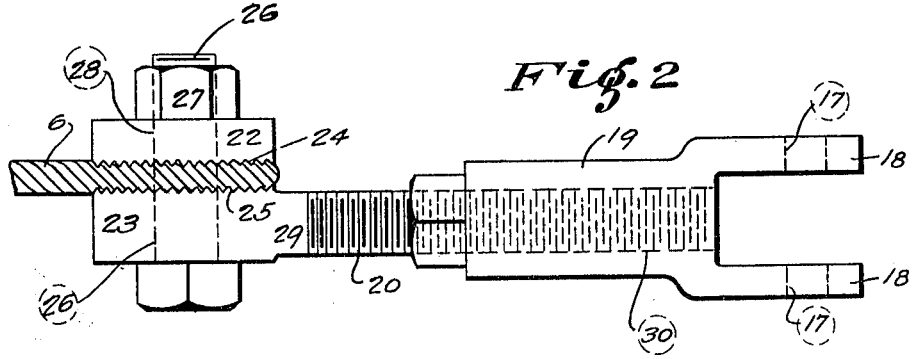
Fig. 2 is a top plan view.
Figure 4:
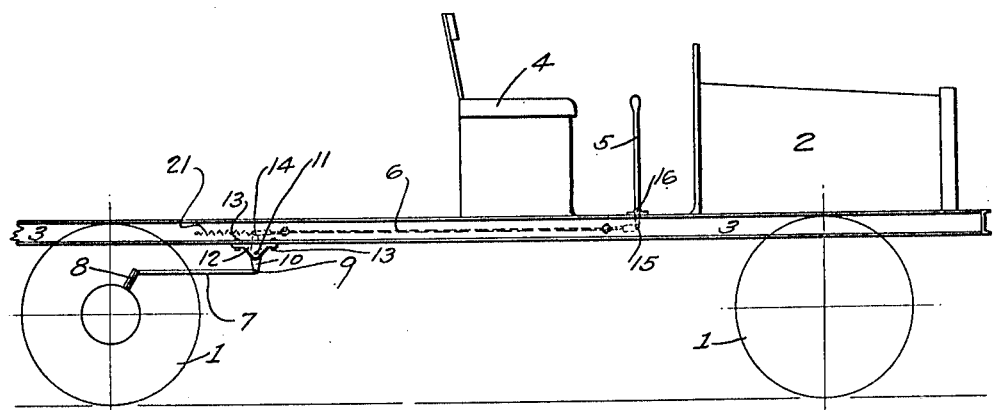
Fig. 4 is a diagrammatic view in side elevation showing the location of this device and connected parts relative to a motor vehicle.

Due to the desire to provide brake-operating means which is readily attachable to and usable in connection with any kind or size of motor vehicle, this invention substitutes a cable 6 for the rod usually used to operate a brake in connection with the rear wheel. Of course there is a pair of cables 6 to a vehicle just like there is in common practice a pair of rods. A shaft 7 is pivotally attached in any suitable manner to the member 8 that directly produces action of the brake (not shown in the drawings) and the said rod 7 is pivoted at 9 to the equalizing lever 10 fulcrumed at 11 in the bracket 12 attached by bolts 13 to the chase 3. A device such as illustrated in Figs. 1 and 2 is located at each end of wire cable 6 and at the left hand end of Fig. 4 is shown pivoted at 14 to equalizer 10 and at the right hand end of Fig. 4 is pivoted at 15 to the brake handle 5, which brake handle is fulcrumed at 16 to a suitable connection with chase 3.

A pintle (not shown in the drawings) forms the pivots 14 and 15 and passes through the holes 17 in the arms 18 of the block 19, which block is internally threaded to coöperate with the threads of the slack-adjuster 20.

When the handle 5 is pulled toward the driver's seat 4 it draws cable 6 forward, which pulls on the pivot 14 and forces the lower end of the equalizer 10 backward, thereby pushing rod 7 and by means of the member 8 causing the brake to set. There will be the usual ratchet or other suitable means (not shown in the drawings) for holding the brake handle 5 so long as it is desired that the brake shall remain set. This engagement of the said holding means and pushing the brake handle 5 to the position shown in Fig. 4 allows spring 21 to pull equalizer 10 to the position shown in Fig. 4, which causes the lower end of equalizer 10 to pull rod 7 and member 8, thus releasing the brake.

Figure 3:
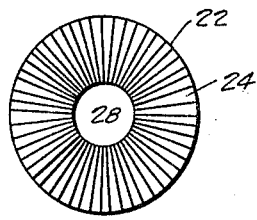
Fig. 3 is a detail view in top plan of one of the cable-gripping jaws.

A rod would not be suitable for all kinds and sizes of motor vehicles, as is the cable 6, as the rod would be of a fixed size, but the length of the cable 6 can be adjusted by means of the pair of jaws 22 and 23 so that the cable is always taut. The upper jaw 22 is that which is shown in bottom plan view in Fig. 3 and contains the teeth 24, similar teeth 25 being found in the lower jaw 23, which opposing teeth tightly grip between them the end of cable 6, as shown in Figs. 2 and 1, the necessary gripping force for this purpose being supplied by bolt 26 and nut 27, which bolt 26 passes through the hole 28 in jaw 22 and through a similar hole in jaw 23. Jaw 23 is formed in the end of member 29 that carries the slack-adjuster 20. It will be plainly seen that the cable 26 can be lengthened or shortened as desired by adjustment within the jaws 22 and 23 and that it can be rendered as taut as necessary by turning the slack-adjuster 20 relative to the block 19, the internal threads 30 in block 19 going all the way through said block 19 so that if necessary slack-adjuster 20 can protrude between arms 18.

Having thus described this invention, we hereby reserve the benefit of all changes in form, arrangement, order, or use of parts, as it is evident that many minor changes may be made therein without departing from the spirit of this invention, or the scope of the following claims.

We claim:

1. A brake-operating means comprising a rod, a lever, a pivot for the said lever, a pivotal connection between the said lever and the said rod, a spring adapted to actuate the said lever and rod in one direction, a cable adapted to actuate the same in the opposite direction, and means for pulling the said cable, and means for adjusting the length of the said cable, the same comprising a pair of gripping jaws and means for drawing the said jaws together.

2. A brake-operating means comprising a rod, a lever, a pivot for the said lever, a pivotal connection between the said lever and the said rod, a spring adapted to actuate the said lever and rod in one direction, a cable adapted to actuate the same in the opposite direction, and means for pulling the said cable, and means for adjusting the length of the said cable, the same comprising a pair of gripping jaws and means for drawing the said jaws together, and means for adjusting the slack in the said cable consisting of a pair of coöperative threaded elements.

3. A brake-operating means comprising a rod, a lever, a pivot for the said lever, a pivotal connection between the said lever and the said rod, a spring adapted to actuate the said lever and rod in one direction, a cable adapted to actuate the same in the opposite direction, and means for pulling the said cable, the same comprising a pair of gripping jaws and means for drawing the said jaws together, and means for adjusting the slack in the said cable consisting of a pair of coöperative threaded elements, the same being pivoted to the brake-handle.

In testimony whereof we hereunto affix our signatures.

ISIDOR M. JACOBS.
WILLIAM CRAMER.

Copies of this patent may be obtained for five cents each, by addressing the "Commissioner of Patents, Washington, D. C."